Oct. 18, 1927.
D. S. ANTHONY
1,645,847
FLOUR MILL
Filed Sept. 8, 1924
2 Sheets-Sheet 1
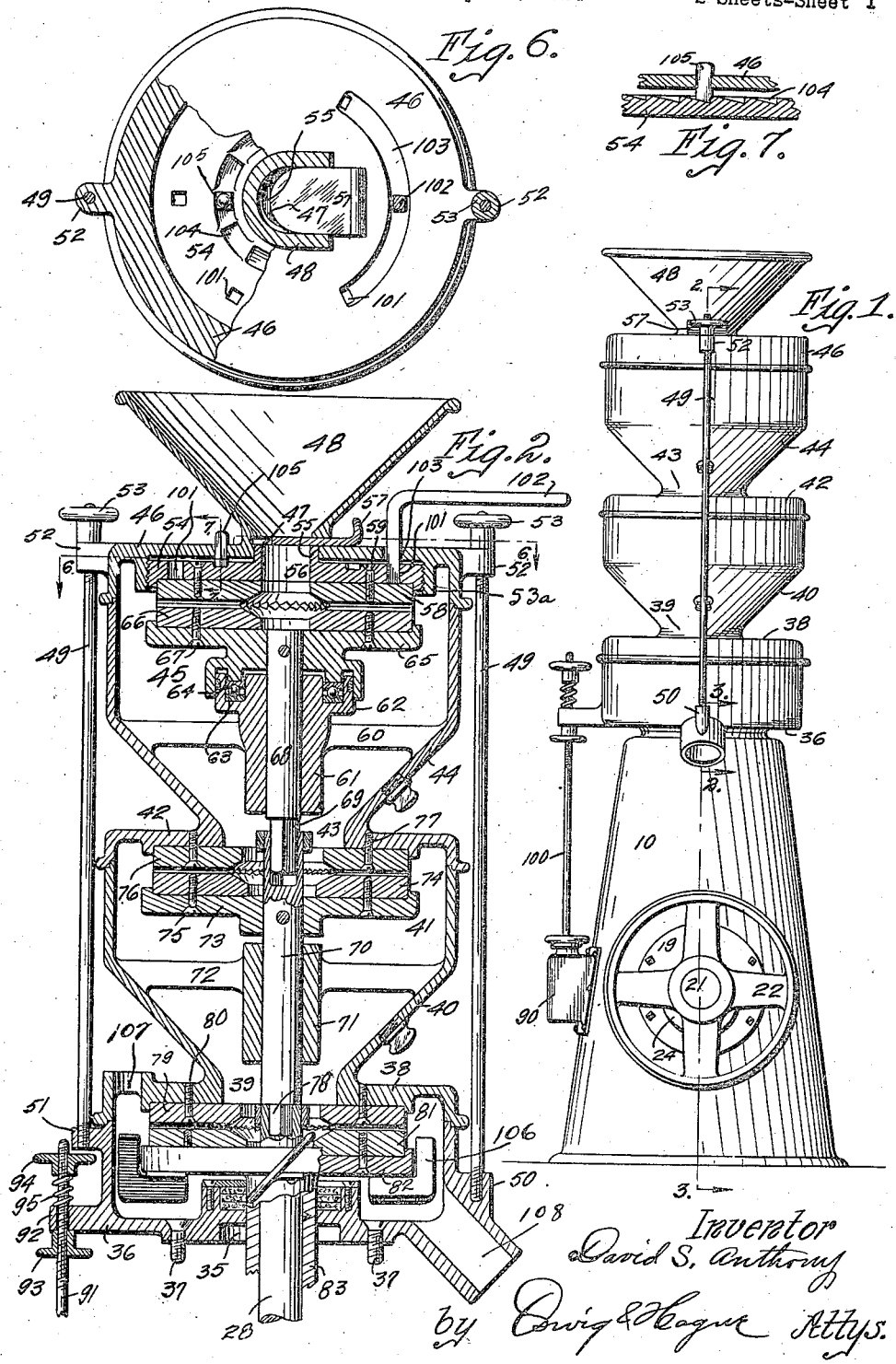
Inventor
David S. Anthony
by Orwig & Hague Attys.

Oct. 18, 1927.
D. S. ANTHONY
1,645,847
FLOUR MILL
Filed Sept. 8, 1924    2 Sheets-Sheet 2
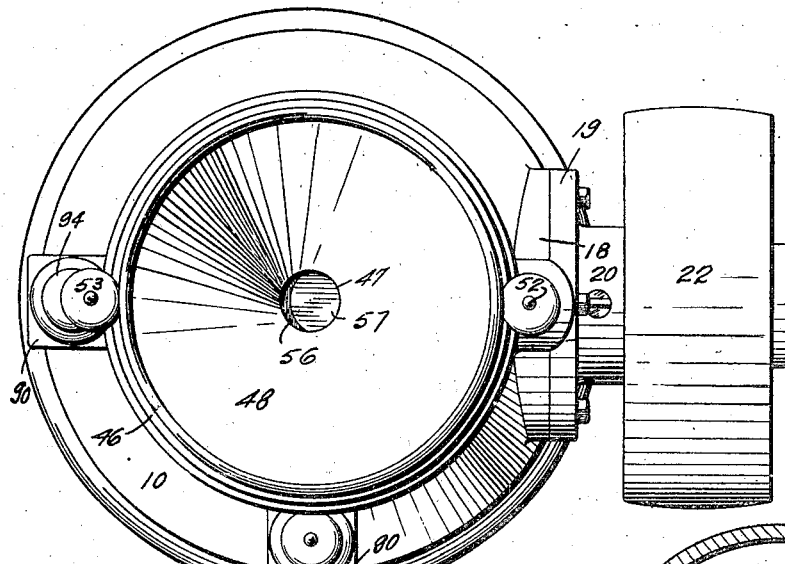
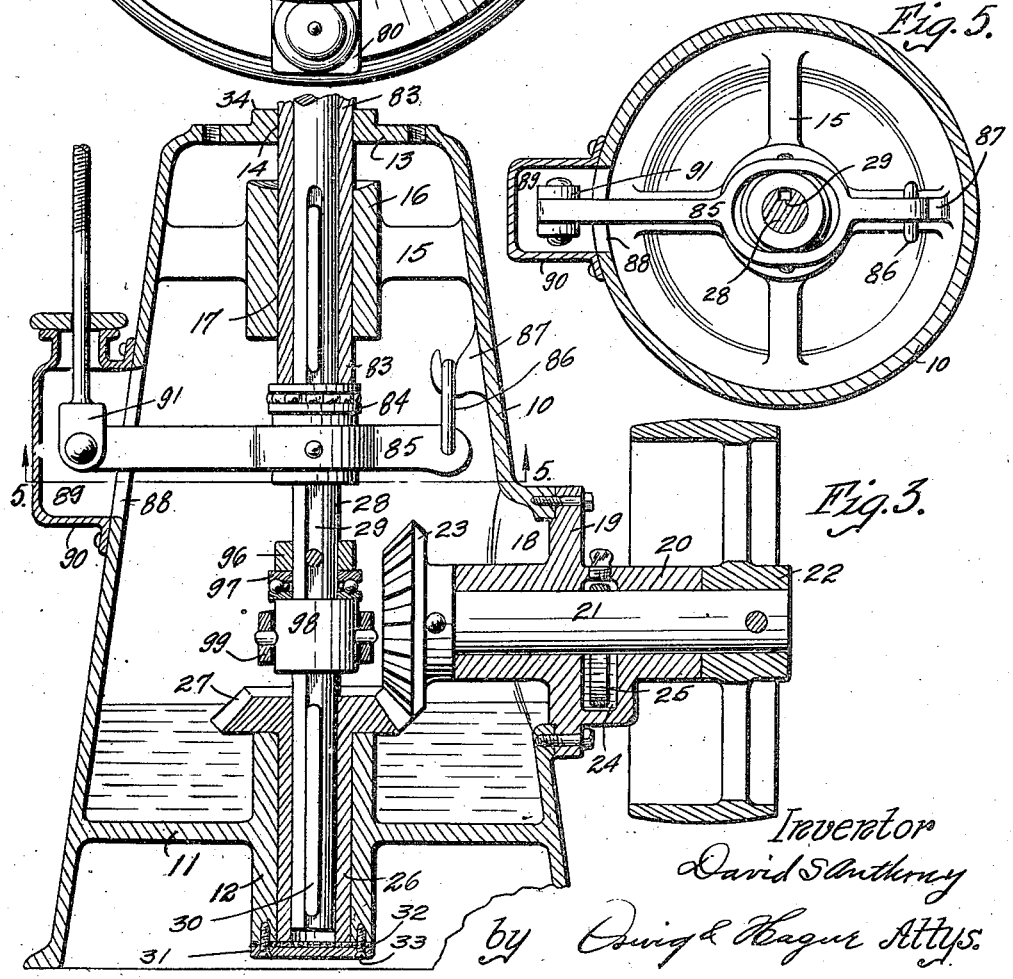
Inventor
David S Anthony
by Owig & Hager Attys.

Patented Oct. 18, 1927.

1,645,847

UNITED STATES PATENT OFFICE.

DAVID S. ANTHONY, OF SAN ANTONIO, TEXAS.

FLOUR MILL.

Application filed September 8, 1924. Serial No. 736,560.

This invention relates to improvements in flour mills.

The object of my invention is to provide a flour mill of simple, durable and inexpensive construction which may be easily and quickly assembled or torn apart for changing the burrs or renewal.

A further object is to provide in a flour mill a series of sets of burrs or grinding elements so arranged that grain to be ground may be fed successively to the said burrs in such a manner that the grinding takes place in distinct and independent grinding operations, the first grinding is comparatively coarse and then successively reducing the flour as it passes from one stage to the other.

A further object is to provide in a flour mill a series of sets of burrs so arranged that the flour may be ground in successive stages for the purpose of producing a better grade of flour and also for reducing the power required to operate the mills.

A further object is to provide in a mill having a series of sets of grinding elements, means whereby each set of grinding elements may be independently adjusted.

A further object is to provide in a flour mill, improved means for cooling the grinding elements.
My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved mill.

Figure 2 is an enlarged, detail, sectional, vertical view of the grinding elements.

Figure 3 is a vertical sectional view of the supporting base.

Figure 4 is a plan view of my improved mill.
Figure 5 is a detail transverse, sectional view taken on the line 5—5 of Figure 3.

Figure 6 is a detail sectional view taken on the line 6—6 of Figure 2.

Figure 7 is an enlarged, detail, sectional view taken on the line 7—7 of Figure 2.

My improved mill comprises a conical shaped base 10 formed hollow and provided with a bottom member 11 supported somewhat above the lower edge of the base member 10. The central portion of the bottom 11 is provided with a vertical hub 12. The upper end of the base 10 is provided with a top portion 13 having a central and vertical opening 14. Below the top a short distance is a spider 15 having a central hub 16 provided with a vertical opening 17.

One side of the base 10 is provided with an opening 18 designed to receive a cover plate 19 which carries a horizontally arranged hub 20, which is provided with a drive shaft 21, the outer end of which has a belt pulley 22, and the inner end is provided with a beveled gear 23. The hub 20 has an oil cavity 24 in which is mounted an oil ring 25. This provides means for lubricating the shaft 21.

Rotatively mounted in the hub 12 is a sleeve 26, the upper end of which is provided with a beveled gear 27 in mesh with the beveled gear 23. The sleeve 26 is designed to slidably receive a vertical shaft 28 which extends upwardly through the openings 14 and 17. The shaft 28 is provided with a long key way 29, the lower end of which is provided with a key 30 for the sleeve 26, thereby providing means whereby the shaft 28 will be rotated through the sleeve 26 and the gear device above described.

The lower end of the hub 12 is provided with a plate 31 and a packing 32, the plate being secured in position by set screws 33. This provides an oil tight bearing for the lower end of the shaft 28.

The central portion of the cover member 13 is provided with a hub 34 designed to enter an opening 35 in a cylindrical casing 36, said casing being secured to the plate 13 by set screws 37. Detachably mounted on the upper edge of the casing 36 is a cover member 38 having a central opening 39. Surrounding the opening 39 is a funnel shaped casing 40, the upper edge of which terminates in a cylindrical portion 41. The casing 36 forms a chamber for the third reduction, while the casings 40 and 41 form a chamber for the second reduction. The top edge of the member 41 is provided with a cover plate 42 having a central opening 43 and a funnel shaped casing 44 terminating in a cylindrical casing 45 for the first reduction.

The top edge of the casing 45 is provided with a cover plate 46 having a central opening 47, said opening being provided with a feed hopper 48. All of the said reducing chambers are rigidly secured together by means of vertically arranged bolts 49, the lower ends of which are rigidly secured in the lugs 50 and 51, while the upper ends are slidably mounted in lugs 52 in the cover plate 46. The upper end of each of the bolts is provided with a hand nut 53 which provides means whereby the various casing members forming the reduction chambers may be rigidly secured together.

The under face of the top plate 46 is provided with a downwardly extending annular flange 53$^a$ which is internally screw threaded. The screw threaded portion is designed to receive a plate 54 having an upwardly extending hub 55 designed to enter the opening 47, said hub being provided with a feed opening 56. A slide valve 57 is provided for regulating the flow of grain into the opening 56. The under surface of the plate 53$^a$ is provided with a stationary burr or grinding element 58 rigidly secured in position by means of screws 59.

The top edge of the chamber 44 is provided with a spider 60 having a central hub 61. The upper portion of the hub 61 is provided with an annular flange 62 to form an annular groove 63 in which is mounted the thrust bearing 64. Mounted on the bearing 64 is a plate 65, the upper surface of which is provided with a burr 66, designed to coact with the burr 58, which is secured in position by means of screws 67.

The plate 65 is rigidly secured to the upper end of a vertically arranged shaft 68 which is rotatively and slidably mounted in the hub 61. The lower end of the shaft 68 extends downwardly through the opening 43 and is provided with a square end 69 designed to be telescopically received in the upper end of a shaft 70 which is slidably and rotatively mounted in a hub 71 supported by a spider 72 from the upper edge of the casing 40. The upper end of the shaft 70 is provided with a burr supporting plate 73 to which is mounted a burr 74 by means of screws 75. The under surface of the plate 42 is provided with a coacting burr 76 secured in position by screws 77. This forms the burrs for what I shall term the second reduction.

The lower end of the shaft 70 is provided with a squared portion 78 designed to be telescopically received in the upper end of the shaft 28. The under surface of the plate 38 is provided with a burr 79 secured in position by means of screws 80. A coacting burr 81 is mounted on a plate 82, said plate being supported on the upper end of a sleeve 83 slidably and nonrotatively mounted on the shaft 28 and within the openings 17 and 14. The lower end of the sleeve 83 is supported by a thrust bearing 84. The said bearing 84 is pivotally received within a yoke 85, one end of which is provided with a pivoted link 86 placed over a hook 87 formed on the inner surface of the casing 10. The opposite end of the yoke 85 extends outwardly through an opening 88 in the side of the casing 10 and into a compartment 89 formed by a casing member 90 secured to the outer surface of the casing 10. The free end of the yoke 85 is pivoted to an upwardly extending control rod 91, the upper end of which is screw threaded.

The upper end of the rod 91 extends through a lug 92 formed from the casing 36. For adjusting the rod 91 I have provided hand nuts 93 and 94. A spring 95 is provided between the lug 92 and the hand nut 94. This provides means whereby the sleeve 83 may be elevated or lowered and in turn the burr 81, thus providing adjustment for the third set of grinding elements.

The lower end of the shaft 28 is provided with a collar 96 which is supported by means of a thrust bearing 97 supported by a collar 98 within a yoke 99, said yoke 99 being similar to the yoke 85 and supported and operated in a similar manner, said yoke being elevated by a rod 100. The rod 100 provides means for vertical adjustment of the shaft 28 and in turn the burr 74, thereby providing adjustment for the second set of grinding elements.

The first set of grinding elements comprises the burrs 58 and 66 which are adjusted by rotating the plate 54 in the screw threaded flange 53$^a$, causing the burr 58 to be raised and lowered. The adjustment of said plate 54 is accomplished by providing a series of squared holes 101 which are designed to receive one end of an L-shaped tool 102, the said tool extending through a slot 103 in the plate 46. To retain the plate against movement after it has been adjusted, I have provided a series of teeth 104 in the plate 54 which are designed to receive a lock pin 105. By this arrangement it will be seen that I have provided means whereby each set of grinding elements may be independently adjusted.

The plate 82 has its peripheral edge provided with a set of fan blades 106, which serve to create a current of air through the casing 36, the air entering through an opening 107 and being discharged through an opening 108 which also serves as a discharge opening for the flour. By this arrangement it will be seen that as the plate 82 is rotated, a current of air will be drawn through the opening 107 and down past the peripheral edge of the burrs 79 and 81, which greatly assists in cooling the said burrs, which necessarily have to run very close together and create a certain amount of heat. This current of air also assists in discharging ground flour.

The operation of my device is as follows:

The grain to be ground is placed in the hopper 48 and the belt wheel 22 rotated by any suitable power, causing the shafts 28 and 70 and 68 to be rotated, and in turn the burrs 81, 74 and 66, all of which are driven in unison. The grain is fed through the opening 56 and is run between the burrs 58 and 66, which are provided with coarse radially arranged teeth and form the first reduction in grinding which is quite coarse. This flour is then fed to the casing 44 through the opening 43 and between the burrs 74 and 76, which are provided with finer teeth than the first said burrs, the coarse flour being delivered over the periphery of the burr 74. This constitutes the second reduction. This flour is then delivered to the opening 39, thence to the burrs 81 and 79 which are provided with a very fine set of teeth and which are formed close together. This constitutes the third stage of the reduction, the flour being discharged through the opening 108.

By this arrangement it will be seen that I have provided successive stages of reduction or grinding, each stage of which may be independently adjusted for coarseness. I find by actual practice that it requires but about fifty percent of power to operate a mill similar to the one I have just described over the ordinary type using a single set of burrs. A better grade of flour is also produced, due to the fact that the burrs may be run at a lower temperature, preventing the heating of the flour to such a degree that it will become overheated, as would have to be done with a single reduction, due to the fact that the burrs become heated. With my device I have provided three sets of burrs which are spaced apart a considerable distance, and which are cooled to a large extent through conduction and radiation through the casings in which they are mounted, the flour from each successive stage falling on the conical shaped casing where it is cooled before it enters the second reduction. I have provided the fan for the last stage to further assist in cooling at that point.

It will further be seen that I have provided a considerable saving in the cost of burrs, due to the fact that the fine burrs are the ones that wear most rapidly, and it is only necessary in my mill to remove this set, which may be done at a very low cost, while in an ordinary mill, if the fine portion of the burr wears out, it is necessary to remove the whole burr, the cost of which is very great.

By mounting the burrs of each stage or reduction in a separate compartment, all of which lock together by means of two rods, I have provided means whereby the mill may be easily and quickly torn down and a new set of burrs placed in position, this being accomplished during a period of less than five minutes, thereby saving a considerable time.

By closing the lower end of the hub 12, I have provided means whereby the lower portion of the casing 10 may be filled with oil and perfect lubrication assured for the driving gears.

I claim as my invention:

1. A flour mill comprising a series of fixed grinding elements spaced apart one above the other, a rotatively mounted grinding element for each of said fixed grinding elements, each of said rotatively mounted elements being mounted on a shaft operating about a common center having their adjacent ends telescopically connected, means for independently moving said shafts longitudinally for adjusting the movable grinding elements relative to the fixed grinding elements.

2. A flour mill comprising a base, a casing having a series of grinding compartments, a set of grinding elements for each of said compartments, comprising a stationary member and a movable member, a vertical sleeve rotatively mounted for supporting one of said movable elements, a shaft rotatively and slidably mounted in said sleeve for supporting the other one of said movable elements, a lever for imparting sliding movement to said sleeve, a lever for imparting sliding movement to said shaft, and a screw threaded bolt for adjusting the free end of each of said levers.

3. A flour mill comprising a base, a casing having a series of grinding compartments, a set of grinding elements for each of said compartments comprising a stationary and movable member, a vertical shaft rotatively and slidably mounted for supporting one of said movable elements, a sleeve slidably mounted on said shaft for supporting another one of said movable grinding elements, means for elevating and lowering said shaft, means for elevating and lowering said sleeve, and means for imparting rotary movement to said shaft and said sleeve.

4. In a flour mill, a grinding casing, a cover member for said casing having a central opening, a downwardly extending annular flange on the under surface of said cover member, said flange being internally screw threaded, a screw threaded plate supported in said flange, a grinding element detachably fixed to said plate, means for rotating said plate, means for locking said plate in a number of its rotary positions of movement, a coacting grinding element rotatively mounted, means for imparting rotary movement to said second element, and means for feeding grain to said grinding elements.

5. A flour mill comprising a base, a grinding casing secured to the upper face of said base, a second grinding casing detachably supported and carried by the first said casing, a stationary burr for each of said casings, a movable burr for each of said stationary burrs, a vertical shaft for driving one of said movable burrs, a sleeve rotatively and slidably mounted on the first said shaft for driving the second said movable burr, means for elevating and lowering said shaft, and means for elevating and lowering said sleeve, the upper one of said casings including means for delivering material from the upper set of burrs to the lower set of burrs.

Des Moines, Iowa, August 5, 1924.

DAVID S. ANTHONY.